United States Patent
Shao et al.

(10) Patent No.: US 10,181,092 B2
(45) Date of Patent: Jan. 15, 2019

(54) METHOD AND SYSTEM FOR RECONSTRUCTING SUPER-RESOLUTION IMAGE

(71) Applicant: Wuhan University, Wuhan (CN)

(72) Inventors: Zhenfeng Shao, Wuhan (CN); Lei Wang, Wuhan (CN); Zhongyuan Wang, Wuhan (CN); Jiajun Cai, Wuhan (CN)

(73) Assignee: WUHAN UNIVERSITY, Wuhan (CN)

( * ) Notice: Subject to any disclaimer, the term of this patent is extended or adjusted under 35 U.S.C. 154(b) by 0 days.

(21) Appl. No.: 15/481,430

(22) Filed: Apr. 6, 2017

(65) Prior Publication Data

US 2017/0293825 A1  Oct. 12, 2017

(30) Foreign Application Priority Data

Apr. 8, 2016 (CN) .......................... 2016 1 0216592

(51) Int. Cl.
*G06K 9/66* (2006.01)
*G06T 5/50* (2006.01)
(Continued)

(52) U.S. Cl.
CPC .............. *G06K 9/66* (2013.01); *G06T 3/4053* (2013.01); *G06T 5/50* (2013.01); *G06T 11/60* (2013.01); *G06T 2207/20224* (2013.01)

(58) Field of Classification Search
CPC ......... G06T 3/4053; G06T 5/001; G06T 5/50; G06T 11/60; G06T 2207/20224; G06K 9/66
(Continued)

(56) References Cited

U.S. PATENT DOCUMENTS

2014/0072242 A1* 3/2014 Wei ...................... H04N 19/176
382/299

OTHER PUBLICATIONS

Freeman, et al. (Example-Based Super-Resolution), pp. 56-65, Mitsubishi Electric Research Lab, 2002.*
(Continued)

*Primary Examiner* — Daniel G Mariam
(74) *Attorney, Agent, or Firm* — Matthias Scholl P.C.; Matthias Scholl (57) ABSTRACT

A method for reconstructing a super-resolution image, including: 1) reducing the resolution of an original high-resolution image to obtain an equal low-resolution image, respectively expressed as matrix forms $y_h$ and $y_l$; 2) respectively conducting dictionary training on $y_l$ and $y_{hl}$ to obtain a low-resolution image dictionary $D_l$; 3) dividing the sparse representation coefficients $\alpha_l$ and $\alpha_{hl}$ into training sample coefficients $\alpha_{l\_train}$ and $\alpha_{hl\_train}$ and test sample coefficients $\alpha_{l\_test}$ and $\alpha_{hl\_test}$; 4) constructing an L-layer deep learning network using a root-mean-square error as a cost function; 5) iteratively optimizing network parameters so as to minimize the cost function by using the low-resolution image sparse coefficient $\alpha_{l\_train}$ as the input of the deep learning network; 6) inputting the low-resolution image sparse coefficient $\alpha_{l\_test}$ as the test portion into the trained deep learning network in 5), outputting to obtain a predicted difference image sparse coefficient $\alpha_{hl\_test}$, computing an error between the $\alpha_{hl\_test}$.

5 Claims, 6 Drawing Sheets (51) Int. Cl.
*G06T 11/60* (2006.01)
*G06T 3/40* (2006.01)

(58) Field of Classification Search
USPC .................................................. 382/157, 159
See application file for complete search history.

(56) References Cited

OTHER PUBLICATIONS

Dong, et al. (Image Super-Resolution Using Deep Convolutional Networks), pp. 1-14, IEEE, Jul. 31, 2015.*

* cited by examiner

METHOD AND SYSTEM FOR RECONSTRUCTING SUPER-RESOLUTION IMAGE

CROSS-REFERENCE TO RELATED APPLICATIONS

Pursuant to 35 U.S.C. § 119 and the Paris Convention Treaty, this application claims the benefit of Chinese Patent Application No. 201610216592.X filed Apr. 8, 2016, the contents of which are incorporated herein by reference. Inquiries from the public to applicants or assignees concerning this document or the related applications should be directed to: Matthias Scholl P. C., Attn.: Dr. Matthias Scholl Esq., 245 First Street, 18th Floor, Cambridge, Mass. 02142.

BACKGROUND OF THE INVENTION

Field of the Invention

The present disclosure belongs to the technical field of remote sensing image processing, and relates to a method and system for reconstructing a super-resolution image in combination with sparse representation and deep learning.

Description of the Related Art

Image super-resolution refers to reconstructing high-resolution images that include more details from a series of lower-resolution images, and has an important application value in such fields as target recognition and positioning of a remote sensing image, environmental monitoring, medical imaging, and the like. Image super-resolution breaks through the limitation of the resolution of a sensor itself, obtains images with higher quality and higher resolution on the basis of the existing image acquisition technology, and provides a foundation for further image analysis.

A traditional image super-resolution needs many low-resolution images of the same scenario as information sources to reconstruct the high-resolution images by integrating the low-resolution images based on reasonable assumption of the mapping from the high-resolution images to the low-resolution images as well as prior information. A common prior model includes a Gaussian prior model, a Markov random field, and the like. However, from the viewpoint of mathematics, since the number of the low-resolution images is inadequate, the above super-resolution reconstruction problem is actually an ill-posed inverse problem and a reconstruction result may not be unique.

Learning-based super-resolution refers to obtaining a certain correspondence relationship between a high-resolution image block and a low-resolution image block by a machine learning method. Conventionally, sparse decomposition coefficients of the low-resolution images are all directly used for the integration of the high-resolution images, or a linear relationship is forced to exist between high-resolution and low-resolution sparse representation coefficients in a process for solving. In fact, the sparse representation coefficients of the same image in different space dimensions are different. Therefore, such simple processing mode is often an important factor that restricts an image super-resolution effect.

SUMMARY OF THE INVENTION

Aiming at the defects of the existing image super-resolution reconstruction technology, the purpose of the present disclosure is to provide a new technical solution for using a deep learning network to learn a mapping relationship between sparse representation coefficients of a high-resolution image and a low-resolution image.

The technical solution of the present disclosure is as follows: A method for reconstructing a super-resolution image in combination with sparse representation and deep learning, comprising the following:

a) reducing the resolution of an original high-resolution image to obtain an equal low-resolution image, respectively expressed as matrix forms $y_h$ and $y_l$, and computing a difference portion between two images, $y_{hl}=y_h-y_l$;

b) respectively conducting dictionary training on $y_l$ and $y_{hl}$ to obtain a low-resolution image dictionary $D_l$, a difference image dictionary $D_{hl}$ and corresponding sparse representation coefficients $\alpha_l$ and $\alpha_{hl}$;

c) dividing the sparse representation coefficients $\alpha_l$ and $\alpha_{hl}$ into training sample coefficients $\alpha_{l\_train}$ and $\alpha_{hl\_train}$ and test sample coefficients $\alpha_{l\_test}$ and $\alpha_{hl\_test}$;

d) constructing an L-layer deep learning network using a root-mean-square error as a cost function;

e) iteratively optimizing network parameters so as to minimize the cost function by using the low-resolution image sparse coefficient $\alpha_{l\_train}$ as the input of the deep learning network, using the corresponding difference image sparse coefficient $\alpha_{hl\_train}$ as a target output and using $\hat{\alpha}_{hl\_train}$ as a network-predicted difference image sparse coefficient, until a trained deep learning network is obtained;

f) inputting the low-resolution image sparse coefficient $\alpha_{l\_test}$ as the test portion into the trained deep learning network in e, outputting to obtain a predicted difference image sparse coefficient $\hat{\alpha}_{hl\_test}$, computing an error between the $\hat{\alpha}_{hl\_test}$ and a corresponding true difference image sparse coefficient $\alpha_{hl\_test}$, and verifying that the deep learning network obtained by training in e is a mapping between the low-resolution image sparse coefficient and the difference image sparse coefficient when the error is less than a given threshold;

g) expressing the low-resolution image to be subjected to resolution increase as the matrix form $z_l$, expressing $z_l$ with the dictionary $D_l$, recording a corresponding sparse coefficient as $\beta_l$, inputting $\beta_l$ into the trained deep learning network to obtain a predicted difference image sparse coefficient $\beta_{hl}$, reconstructing a difference portion $\hat{z}_{hl}$ with the dictionary $D_{hl}$; and finally reducing $\hat{z}_h=\hat{z}_{hl}+z_l$ into an image form to reconstruct a corresponding high-resolution image $z_h$.

Moreover, in a), firstly, a high-resolution image in a training sample library is cut into N d×d image blocks; the resolution of each image block is reduced to obtain N corresponding low-resolution image blocks; then column vectors formed by stretching the high-resolution image blocks compose a matrix $y_h \in R^{d^2 \times N}$, and column vectors formed by stretching the low-resolution image blocks compose a matrix $y_l \in R^{d^2 \times N}$; and the difference portion $y_{hl}=y_h-y_l$ of two matrixes is obtained through computation.

Moreover, in b), dictionary training is respectively conducted on $y_l$ and $y_{hl}$ to obtain a corresponding low-resolution image dictionary $D_l$, a difference image dictionary $D_{hl}$ and corresponding sparse representation coefficients $\alpha_l$ and $\alpha_{hl}$, equivalent to solving optimization problems as follows:

$$\min_{D_l,\alpha_l} \|\alpha_l\|_0 \quad \text{subject to} \quad \|y_l - D_l\alpha_l\|_F^2 \leq \varepsilon \qquad (1)$$

$$\min_{D_{hl}, \alpha_{hl}} \|\alpha_{hl}\|_0 \quad \text{subject to} \quad \|y_{hl} - D_{hl}\alpha_{hl}\|_F^2 \leq \varepsilon \quad (2)$$

wherein ε is a reconstruction error threshold.

Moreover, in d), the constructed deep learning network comprises L layers; the output of each layer is recorded as $x^l$, l=0, 1, 2, . . . , L, wherein $x^0$ is a network input and then the output of an $l_{th}$ layer is:

$$x^l = f_l(W^l x^{l-1} + b^l), \, l=1,2,\ldots,L \quad (3)$$

wherein $W^l$ and $b^l$ respectively indicate the weight and the bias term of the $l_{th}$ layer, $f_l(\cdot)$ is an activation function of the $l_{th}$ layer, and the output of the $l_{th}$ layer is a network prediction.

Moreover, in e), an implicit relationship between the low-resolution image sparse coefficient $\alpha_{l\_train}$ and the difference image sparse coefficient $\alpha_{hl\_train}$ is trained by the deep learning network, and by using the low-resolution image sparse coefficient $\alpha_{l\_train}$ as the input of the deep learning network and using the difference image sparse coefficient $\alpha_{hl\_train}$ as a supervision, the network-predicted difference image sparse coefficient is recorded as $$\hat{\alpha}_{hl\_train} = f_L(\ldots f_1(W^1\alpha_{l\_train} + b^1)) \quad (4)$$

a root-mean-square error with a cost function of $\alpha_{hl\_train} - \hat{\alpha}_{hl\_train}$ is taken $$MSRE = \frac{\|\alpha_{hl\_train} - \hat{\alpha}_{hl\_train}\|_F^2}{mn} \quad (5)$$

wherein m and n are respectively the number of dictionary elements and the number of training samples; and the network parameters are optimized iteratively so as to minimize a loss function MSRE, thereby completing network training.

The present disclosure further provides a system for reconstructing a super-resolution image in combination with sparse representation and deep learning, the system comprising:

a first module used for reducing the resolution of an original high-resolution image to obtain an equal low-resolution image, respectively expressed as matrix forms $y_h$ and $y_l$, and computing a difference portion between two images, $y_{hl} = y_h - y_l$;

a second module used for respectively conducting dictionary training on $y_l$ and $y_{hl}$ to obtain a low-resolution image dictionary $D_1$, a difference image dictionary $D_{hl}$ and corresponding sparse representation coefficients $\alpha_l$ and $\alpha_{hl}$;

a third module used for dividing the sparse representation coefficients $\alpha_l$ and $\alpha_{hl}$ into training sample coefficients $\alpha_{l\_train}$ and $\alpha_{hl\_train}$ and test sample coefficients $\alpha_{l\_test}$ and $\alpha_{hl\_test}$;

a fourth module used for constructing an L-layer deep learning network using a root-mean-square error as a cost function;

a fifth module used for iteratively optimizing network parameters so as to minimize the cost function by using the low-resolution image sparse coefficient $\alpha_{l\_train}$ as the input of the deep learning network, using the corresponding difference image sparse coefficient $\alpha_{hl\_train}$ as a target output and using $\hat{\alpha}_{hl\_train}$ as a network predicted difference image sparse coefficient, until a trained deep learning network is obtained;

a sixth module used for inputting the low-resolution image sparse coefficient $\alpha_{l\_test}$ as the test portion into the trained deep learning network in the fifth module, outputting to obtain a predicted difference image sparse coefficient $\hat{\alpha}_{hl\_test}$, computing an error between the $\hat{\alpha}_{hl\_test}$ and a corresponding true difference image sparse coefficient $\alpha_{hl\_test}$, and verifying that the deep learning network obtained by training in the fifth module is a mapping between the low-resolution image sparse coefficient and the difference image sparse coefficient when the error is less than a given threshold; and a seventh module used for expressing the low-resolution image to be subjected to resolution increase as the matrix form $z_l$, expressing $z_l$ with the dictionary $D_l$, recording a corresponding sparse coefficient as $\beta_l$, inputting $\beta_l$ into the trained deep learning network to obtain a predicted difference image sparse coefficient $\beta_{hl}$, reconstructing a difference portion $\hat{z}_{hl}$, with the dictionary $D_{hl}$; and finally reducing $\hat{z} = \hat{z}_{hl} + z_l$ into an image form to reconstruct a corresponding high-resolution image $z_h$.

Moreover, in the first module, firstly, a high-resolution image in a training sample library is cut into N d×d image blocks; the resolution of each image block is reduced to obtain N corresponding low-resolution image blocks; then column vectors formed by stretching the high-resolution image blocks compose a matrix $y_h \in R^{d^2 \times N}$, and column vectors formed by stretching the low-resolution image blocks compose a matrix $y_l \in R^{d^2 \times N}$, and the difference portion $y_{hl} = y_h - y_l$ of two matrixes is obtained through computation.

Moreover, in the second module, dictionary training is respectively conducted on $y_l$ and $y_{hl}$ to obtain a corresponding low-resolution image dictionary $D_l$, a difference image dictionary $D_{hl}$ and corresponding sparse representation coefficients $\alpha_l$ and $\alpha_{hl}$, equivalent to solving optimization problems as follows:

$$\min_{D_l, \alpha_l} \|\alpha_l\|_0 \quad \text{subject to} \quad \|y_l - D_l\alpha_l\|_F^2 \leq \varepsilon \quad (6)$$

$$\min_{D_{hl}, \alpha_{hl}} \|\alpha_{hl}\|_0 \quad \text{subject to} \quad \|y_{hl} - D_{hl}\alpha_{hl}\|_F^2 \leq \varepsilon \quad (7)$$

wherein ε is a reconstruction error threshold.

Moreover, in the fourth module, the constructed deep learning network comprises L layers; the output of each layer is recorded as $x^l$, l=0, 1, 2, . . . , L, wherein $x^0$ is a network input and then the output of an $l_{th}$ layer is:

$$x^l = f_l(W^l x^{l-1} + b^l), \, l=1,2,\ldots,L \quad (8)$$

wherein $W^l$ and $b^l$ respectively indicate the weight and the bias term of the $l_{th}$ layer, $f_l(\cdot)$ is an activation function of the $l_{th}$ layer, and the output of the $l_{th}$ layer is a network prediction.

Moreover, in the fifth module, an implicit relationship between the low-resolution image sparse coefficient $\alpha_{l\_train}$ and the difference image sparse coefficient $\alpha_{hl\_train}$ is trained by the deep learning network, and by using the low-resolution image sparse coefficient $\alpha_{l\_train}$ as the input of the deep learning network and using the difference image sparse coefficient $\alpha_{hl\_train}$ as a supervision, the network-predicted difference image sparse coefficient is recorded as $$\hat{\alpha}_{hl\_train} = f_L(\ldots f_1(W^1\alpha_{l\_train} + b^1)) \quad (9)$$

a root-mean-square error with a cost function of $\alpha_{hl\_train} - \hat{\alpha}_{hl\_train}$ is taken $$MSRE = \frac{\|\alpha_{hl\_train} - \hat{\alpha}_{hl\_train}\|_F^2}{mn} \quad (10)$$

wherein m and n are respectively the number of dictionary elements and the number of training samples; and the network parameters are optimized iteratively so as to minimize a loss function MSRE, thereby completing network training.

The present disclosure overcomes the defects of the existing method which uses a dictionary-combined training mode to allow the high-resolution image and the low-resolution image to share the sparse representation coefficients, and adopts deep learning to fully learn a mapping relationship between the sparse representation coefficients of the low-resolution image and the difference image, so as to obtain a high-resolution reconstruction result with higher precision.

Compared with the existing method, the present disclosure has the advantages and the positive effects: in the image super-resolution reconstruction based on sparse representation, the existing method generally uses a dictionary-combined training mode to allow the high-resolution image and the low-resolution image to share the sparse representation coefficients, or simply performs a linear combination on the high-resolution image and the low-resolution image in a dictionary training process for performing training. However, the sparse representation coefficients of the same image in different space dimensions are often not in a simple linear mapping relationship. The present disclosure has the advantage that an implicit relationship between the sparse representation coefficients of the high-resolution image and the low-resolution image is learned from a great number of samples by the deep learning network, so that the image super-resolution reconstruction precision is higher.

DETAILED DESCRIPTION OF THE EMBODIMENTS

The present disclosure will be further described below in combination with the drawings and the embodiments.

The embodiment of the present disclosure relates to the super-resolution reconstruction of a remote sensing image. As shown in FIGS. 1-6, the embodiment of the present disclosure comprises the following concrete steps:

a: Generating Data

Figure 1:
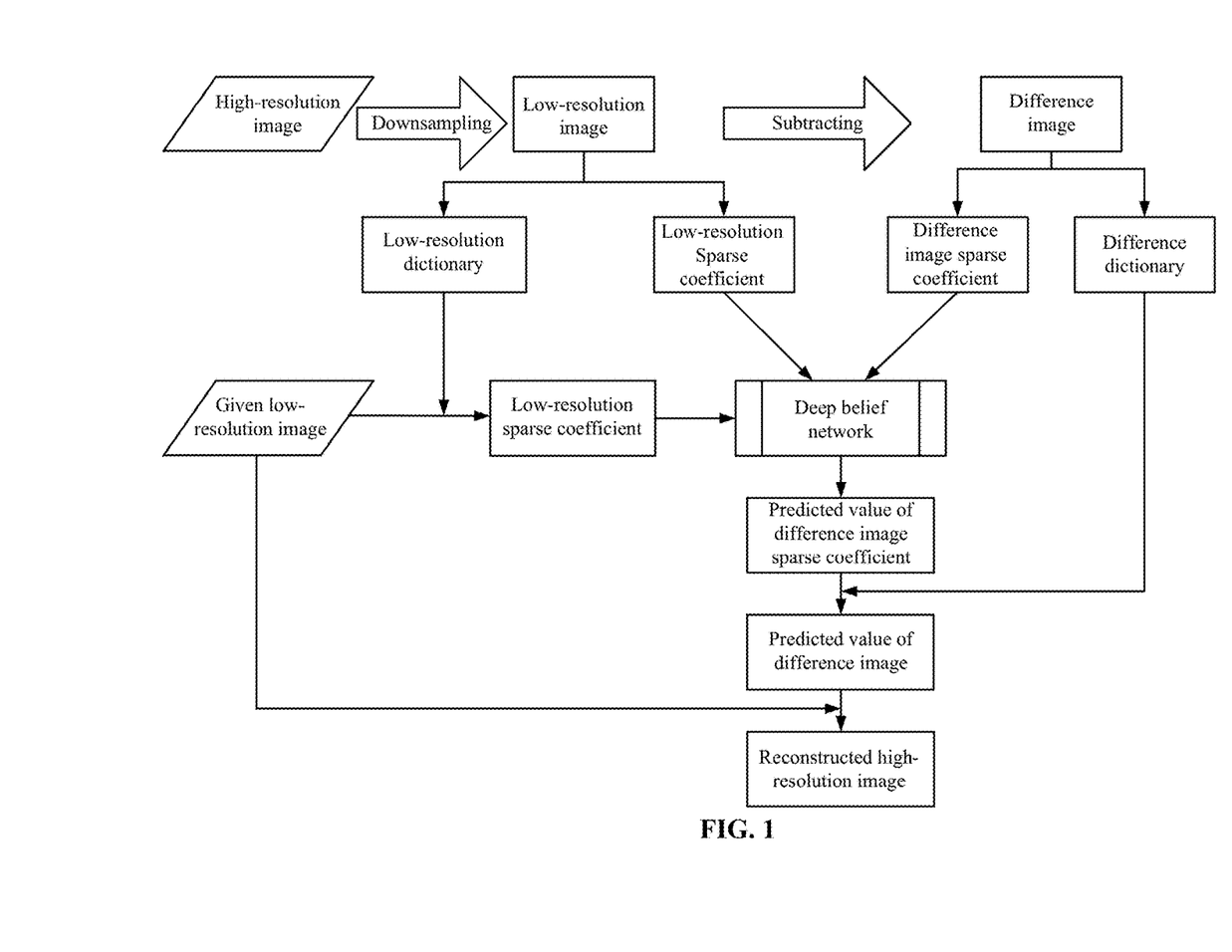
FIG. 1 is a flow chart of a method for reconstructing a super-resolution image of embodiments of the present disclosure.

In the present disclosure, firstly, a high-resolution image in a training sample library is cut into N d×d image blocks; the resolution of each image block is reduced to obtain N corresponding low-resolution image blocks; then column vectors formed by stretching the high-resolution image blocks compose a matrix $y_f \in R^{d^2 \times N}$ (indicating that, $y^h$ is a real matrix of d²×N), and a corresponding matrix $y_f \in R^{d^2 \times N}$ of the low-resolution image is obtained in the same manner; and the difference portion $y_{hl}=y_h-y_l$ of two matrixes is obtained through computation.

b: Dictionary Training and Corresponding Sparse Representation Coefficients

Figure 2:
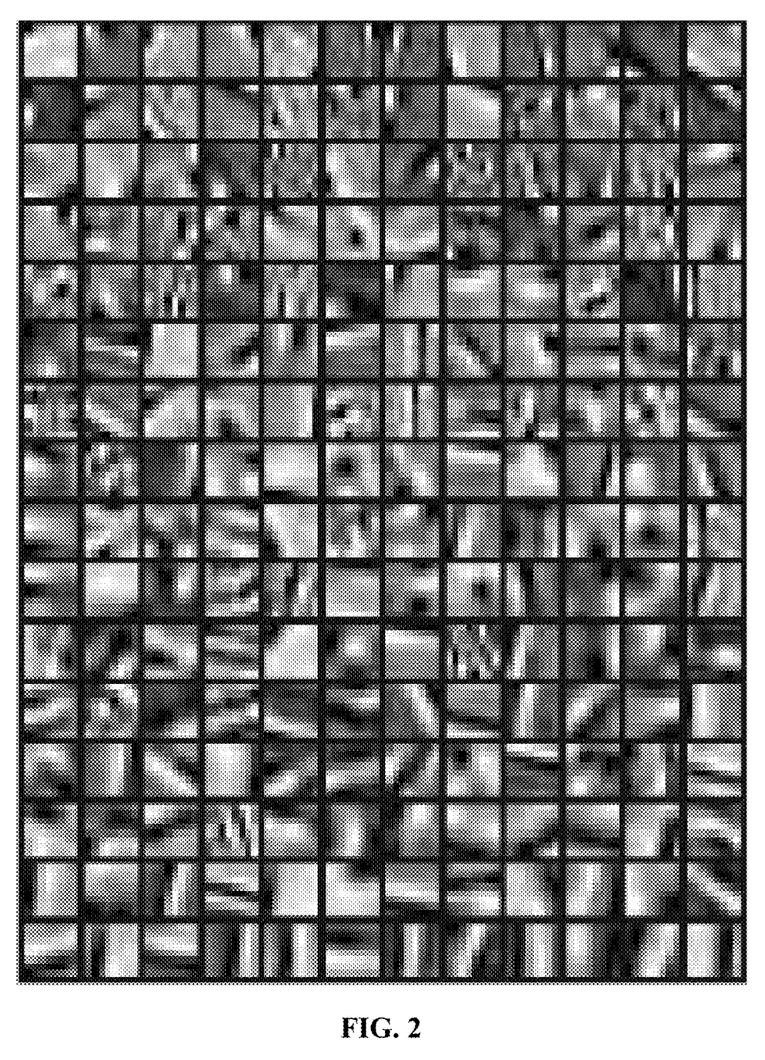
FIG. 2 shows a trained dictionary of difference images. To acquire this dictionary, large amounts of difference images, which are the differences between the corresponding high and low resolution images, are acquired first and used for dictionary training with K-SVD algorithm.
Figure 3:
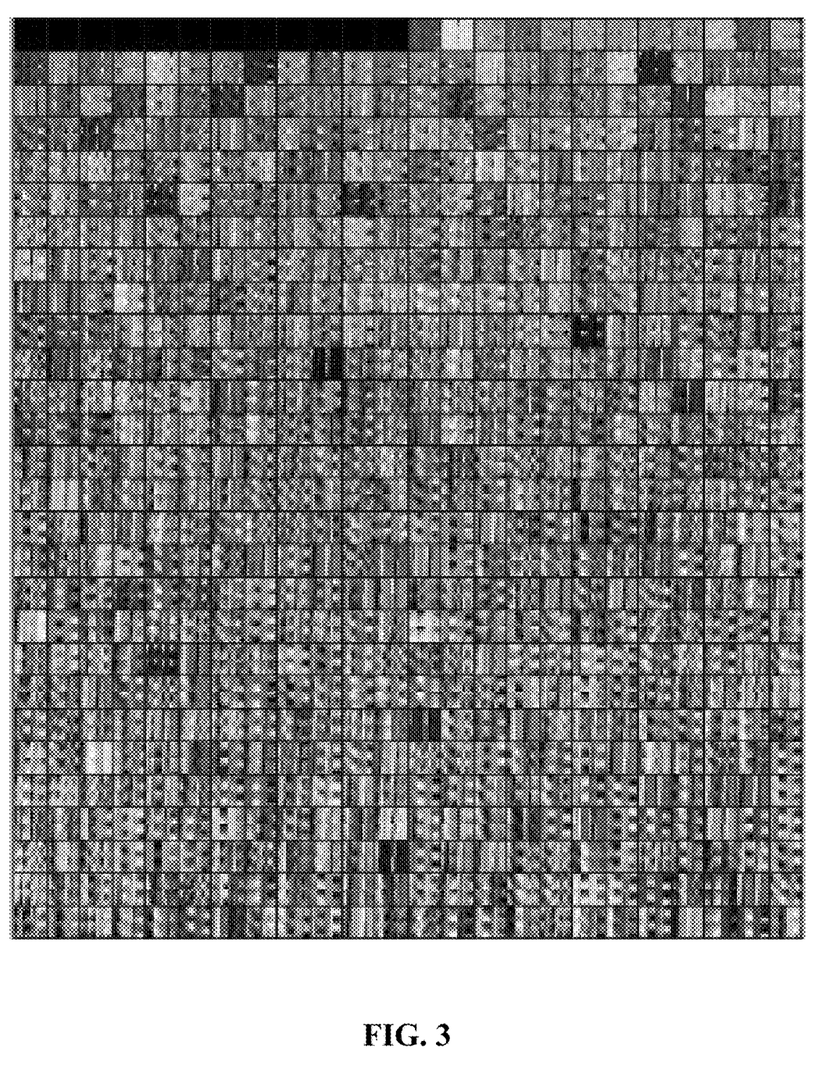
FIG. 3 shows a trained dictionary of low-resolution images. Similar as the training process of difference image dictionary, enormous low resolution images are prepared first and used for dictionary training with K-SVD algorithm. The difference is that, to efficiently use the high frequency information, the first and second order derivatives of low images are both calculated. Then, they are combined together for low resolution image dictionary training.
Figure 4:
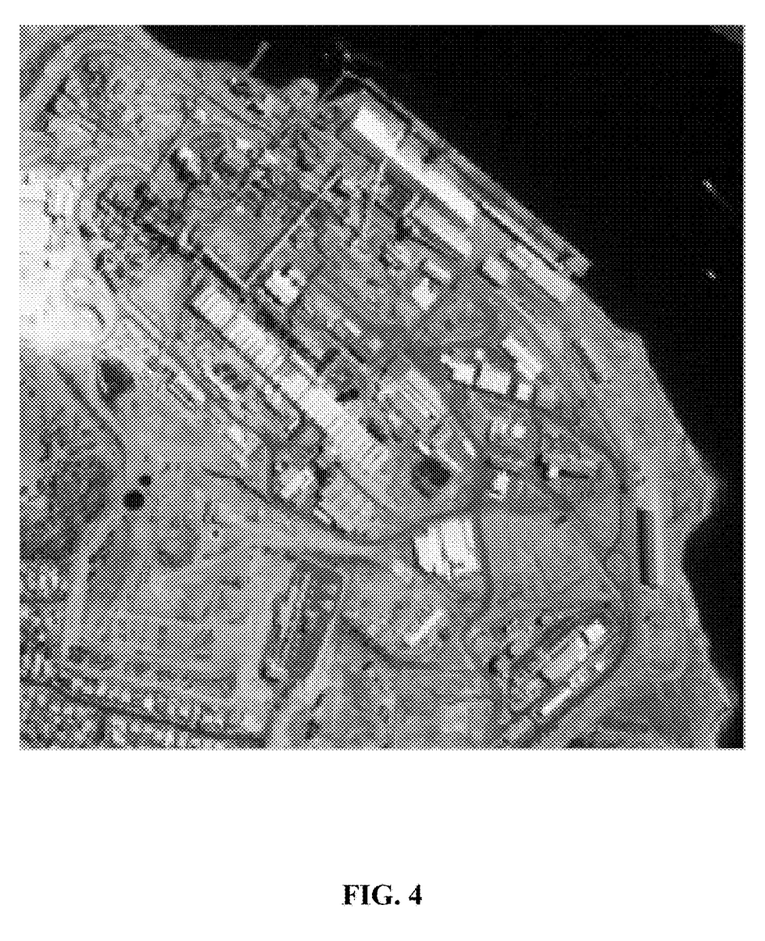
FIG. 4 is an original remote sensing image.

Dictionary training is respectively conducted on $y_l$ and $y_{hl}$ to obtain a corresponding low-resolution image dictionary $D_l$, a difference image dictionary $D_{hl}$ and corresponding sparse representation coefficients $\alpha_l$ and $\alpha_{hl}$, equivalent to solving optimization problems as follows:

$$\min_{D_l, \alpha_l} \|\alpha_l\|_0 \text{ subject to } \|y_l - D_l\alpha_l\|_F^2 \leq \varepsilon \quad (11)$$

$$\min_{D_{hl}, \alpha_{hl}} \|\alpha_{hl}\|_0 \text{ subject to } \|y_{hl} - D_{hl}\alpha_{hl}\|_F^2 \leq \varepsilon \quad (12)$$

wherein $\|\cdot\|_F$ is F-norm; ε is a reconstruction error threshold, generally a smaller value, and can be set according to concrete requirements in concrete implementation.

However, since the above $l_0$ norm constraint problem is an NP-hard problem, a greedy algorithm and the like is required for solving the problem. Tao, Candes, Donoho, et al. have proved that $l_0$ norm can be converted into $l_1$ norm for solving the problem when a signal satisfies a certain sparse condition. In this way, the above optimization problems can be converted into:

$$\min_{D_l, \alpha_l} \|y_l - D_l\alpha_l\|_F^2 + \lambda \|\alpha_l\|_1 \quad (13)$$

$$\min_{D_{hl}, \alpha_{hl}} \|y_{hl} - D_{hl}\alpha_{hl}\|_F^2 + \lambda \|\alpha_{hl}\|_1 \quad (14)$$

wherein λ is a sparse constraint weight (a reference value λ is 0.15, and can be adjusted by those skilled in the art according to a need of a sparse term in concrete implementation). The above optimization problem is a convex optimization problem and can be solved by an optimization algorithm.

c: Dividing the Sparse Representation Coefficients into Training Sample Coefficients and Test Sample Coefficients A dividing proportion can be preset by those skilled in the art in concrete implementation. In the embodiment, the ratio of the training samples to the test samples is about 2:1. Namely, ⅔ of the total samples are used as the training samples, and $\alpha_{l\_train}$ and $\alpha_{hl\_train}$ are respectively used for indicating the low-resolution image sparse coefficient and the difference image sparse coefficient for training; and the remaining ⅓ of the total samples are used as the test samples, and $\alpha_{l\_test}$ and $\alpha_{hl\_test}$ are respectively used for indicating the low-resolution image sparse coefficient and the difference image sparse coefficient for testing.

d: Constructing a Deep Learning Network

The deep learning network constructed in the embodiment is assumed to include L layers (L is recommended as 3, i.e., the network includes two hidden layers and one output layer and the amount of calculation will be increased if the network includes too many layers). the output of each layer is recorded as $x^l$, $l=0, 1, 2, \ldots, L$, wherein $x^0$ is a network input and then the output of an $l_{th}$ layer is:

$$x^l = f_l(W^l x^{l-1} + b^l), l=1,2,\ldots,L \quad (15)$$

wherein $W^l$ and $b^l$ respectively indicate the weight and the bias term of the $l_{th}$ layer, $f_l(\bullet)$ is an activation function of the $l_{th}$ layer. $l_{th}=1, 2, \ldots, L-1$ can be considered as the feature of the network input $x^0$, and the output of the $l_{th}$ layer is a network prediction.

e: Using a Deep Learning Network to Train a Mapping Relationship Between the Low-resolution Image Sparse Coefficient and the Difference Image Sparse Coefficient Features are extracted and predicted layer by layer by using the low-resolution image sparse coefficient $\alpha_{l\_train}$ as the input of the deep learning network and using the difference image sparse coefficient $\alpha_{hl\_train}$ as a supervision, so as to obtain a network-predicted difference image sparse coefficient:

$$\hat{\alpha}_{hl\_train} = f_L(\ldots f_1(W^1 \alpha_{l\_train} + b^1)) \quad (16)$$

wherein $W^l$ and $b^l$ are respectively the weight and the bias term of the 1st layer.

A root-mean-square error with a cost function of $\alpha_{hl\_train} - \hat{\alpha}_{hl\_train}$ is taken $$MSRE = \frac{\|\alpha_{hl\_train} - \hat{\alpha}_{hl\_train}\|_F^2}{mn} \quad (17)$$

wherein m and n are respectively the number of dictionary elements and the number of training samples. The network parameters are optimized iteratively so as to minimize a loss function MSRE, thereby completing network training. The network parameters are iteratively adjusted by a gradient descent method in the embodiment; and the training is ended and a trained deep learning network is obtained until the loss function MSRE is less than a given error threshold δ or the number of iterations reaches a given upper limit. In concrete implementation, the value of the error threshold or the number of iterations can be preset by those skilled in the art.

f: Testing the Deep Learning Network

A low-resolution image sparse coefficient test set $\alpha_{l\_test}$ is inputted into the trained deep learning network in e, and is outputted to obtain a predicted difference image sparse coefficient $\hat{\alpha}_{hl\_test}$, an error between the $\hat{\alpha}_{hl\_test}$ and a corresponding true difference image sparse coefficient $\alpha_{hl\_test}$ is computed, and the deep learning network obtained by training in e is verified as a mapping between the low-resolution image sparse coefficient and the difference image sparse coefficient if the error is less than a given error threshold; otherwise, the network needs to be further trained according to the method in e. In concrete implementation, the error threshold can be preset by those skilled in the art.

g: Reconstructing a High-Resolution Image

The low-resolution image to be subjected to resolution increase is expressed as the matrix form $z_l$ in the same manner according to a; $z_l$ is linearly expressed with the dictionary $D_l$, and a corresponding sparse representation coefficient is recorded as $\alpha_l$, to solve $\beta_l$ in the following formula:

$$z_l = D_l \beta_l \quad (18)$$

Figure 5:
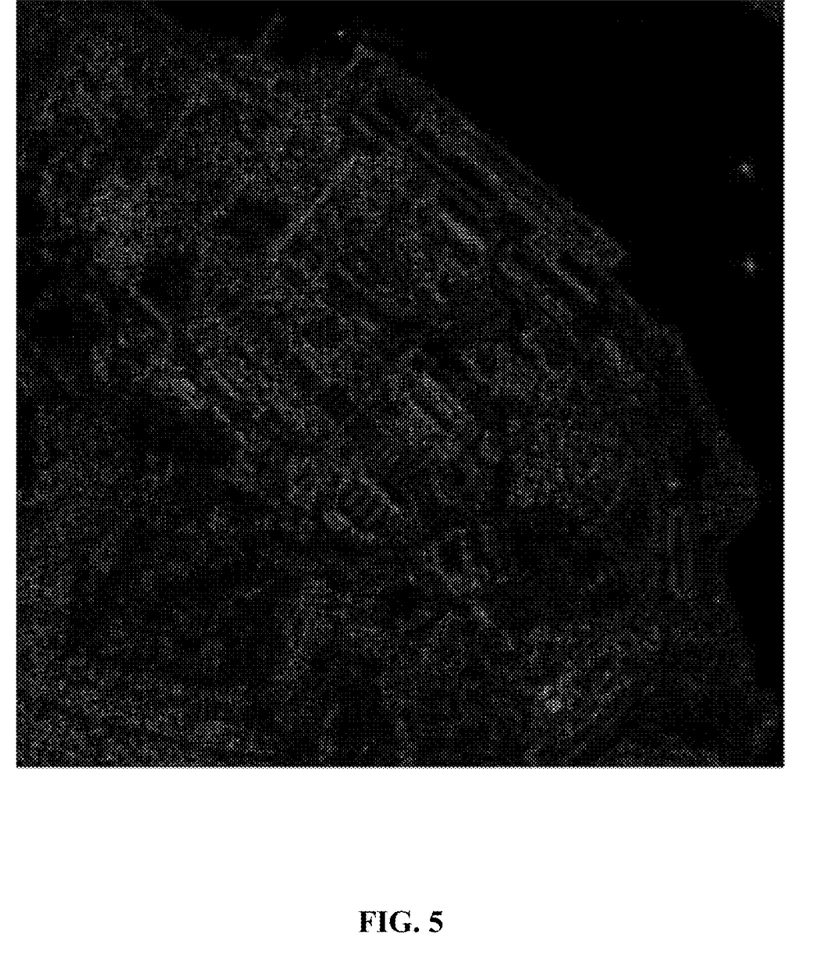
FIG. 5 is a reconstructed high frequency information from image FIG. 4 with the present invention method. Firstly, the original image is sparsely decomposed with trained low resolution image dictionary. Secondly, the corresponding sparse coefficients are input to the trained deep learning network to be mapped to the sparse coefficients of difference image. Then, the difference image can be reconstructed with the corresponding dictionary and the mapped coefficients.

$\beta_l$ is inputted into the trained deep learning network to obtain a predicted difference image sparse representation coefficient $\beta_{hl}$. Combined with the difference image dictionary $D_{hl}$, the following formula is used $$\hat{z}_{hl} = D_{hl} \beta_{hl} \quad (19)$$

Figure 6:
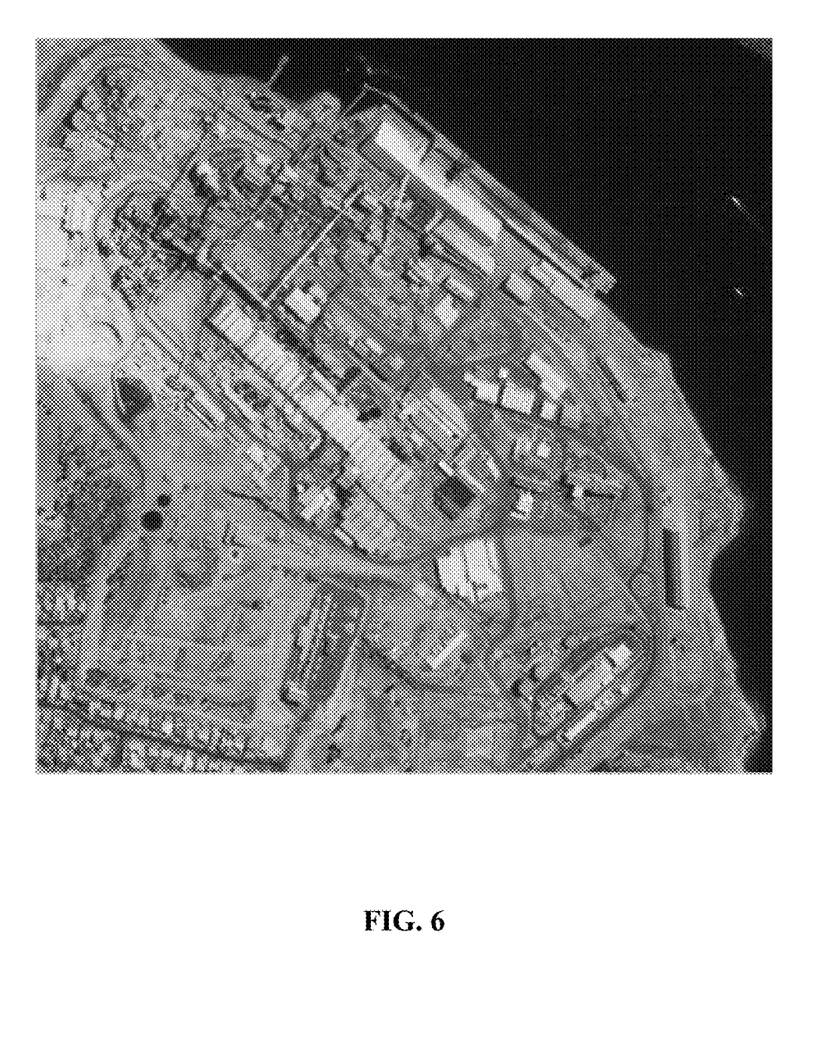
FIG. 6 is the reconstructed high resolution image of FIG. 4 with the present invention method, it is the sum of low resolution image and the reconstructed difference image.

Then a difference portion $\hat{z}_{hl}$ is reconstructed; and finally a high-resolution image matrix form is reconstructed:

$$\hat{z}_h = \hat{z}_{hl} + z_l \quad (20)$$

$\hat{z}_h$ is reduced into an image form to obtain a finally reconstructed high-resolution image $z_h$.

In the above steps, steps d to e are a data preparation portion, steps d to e are a network training portion, f is a network test portion and g is an image super-resolution reconstruction portion.

In concrete implementation, the above flow can realize automatic operation by a software technology, and a corresponding system can also be provided by a modular mode. The embodiment of the present disclosure further provides a system for reconstructing a super-resolution image in combination with sparse representation and deep learning, comprising the following modules:

a first module used for reducing the resolution of an original high-resolution image to obtain an equal low-resolution image, respectively expressed as matrix forms $y_h$ and $y_l$, and computing a difference portion between two images, $y_{hl} = y_h - y_l$;

a second module used for respectively conducting dictionary training on $y_l$ and $y_{hl}$ to obtain a low-resolution image dictionary $D_l$, a difference image dictionary $D_{hl}$ and corresponding sparse representation coefficients $\alpha_l$ and $\alpha_{hl}$;

a third module used for dividing the sparse representation coefficients $\alpha_l$ and $\alpha_{hl}$ into training sample coefficients $\alpha_{l\_train}$ and $\alpha_{hl\_train}$ and test sample coefficients $\alpha_{l\_test}$ and $\alpha_{hl\_test}$;

a fourth module used for constructing an L-layer deep learning network using a root-mean-square error as a cost function;

a fifth module used for iteratively optimizing network parameters so as to minimize the cost function by using the low-resolution image sparse coefficient $\alpha_{l\_train}$ as the input of the deep learning network, using the corresponding difference image sparse coefficient $\alpha_{hl\_train}$ as a target output and using $\hat{\alpha}_{hl\_train}$ as a network-predicted difference image sparse coefficient, until a trained deep learning network is obtained;

a sixth module used for inputting the low-resolution image sparse coefficient $\alpha_{l\_test}$ as the test portion into the trained deep learning network in the fifth module, outputting to obtain a predicted difference image sparse coefficient $\hat{\alpha}_{hl\_test}$, computing an error between the $\hat{\alpha}_{hl\_test}$ and a corresponding true difference image sparse coefficient $\alpha_{hl\_test}$, and verifying that the deep learning network obtained by training in the fifth module is a mapping between the low-resolution image sparse coefficient and the difference image sparse coefficient when the error is less than a given threshold; and a seventh module used for expressing the low-resolution image to be subjected to resolution increase as the matrix form $z_l$, expressing $z_l$ with the dictionary $D_l$, recording a corresponding sparse coefficient as $\beta_l$, inputting $\beta_l$ into the trained deep learning network to obtain a predicted difference image sparse coefficient $\beta_{hl}$, reconstructing a difference portion $\hat{z}_{hl}$ with the dictionary $D_{hl}$; and finally reducing $\hat{z}=\hat{z}_{hl}+z_l$ into an image form to reconstruct a corresponding high-resolution image $z_h$.

For concrete realization of each module, see corresponding steps which will not be repeated again in the present disclosure.

The invention claimed is:

1. A method for reconstructing a super-resolution image, comprising:
   a) reducing the resolution of an original high-resolution image to obtain an equal low-resolution image, respectively expressed as matrix forms $y_h$ and $y_l$, and computing a difference portion between two images, $y_{hl}=y_h-y_l$;
   b) respectively conducting dictionary training on $y_l$ and $y_{hl}$ to obtain a low-resolution image dictionary $D_l$, a difference image dictionary $D_{hl}$ and corresponding sparse representation coefficients $\alpha_l$ and $\alpha_{hl}$;
   c) dividing the sparse representation coefficients $\alpha_l$ and $\alpha_{hl}$ into training sample coefficients $\alpha_{l\_train}$ and $\alpha_{hl\_train}$ and test sample coefficients $\alpha_{l\_test}$ and $\alpha_{hl\_test}$;
   d) constructing an L-layer deep learning network using a root-mean-square error as a cost function;
   e) iteratively optimizing network parameters so as to minimize the cost function by using the low-resolution image sparse coefficient $\alpha_{l\_train}$ as the input of the deep learning network, using the corresponding difference image sparse coefficient $\alpha_{hl\_train}$ as a target output and using $\hat{\alpha}_{hl\_train}$ as a network-predicted difference image sparse coefficient, until a trained deep learning network is obtained;
   f) inputting the low-resolution image sparse coefficient $\alpha_{l\_test}$ as the test portion into the trained deep learning network in e), outputting to obtain a predicted difference image sparse coefficient $\hat{\alpha}_{hl\_test}$, computing an error between the $\hat{\alpha}_{hl\_test}$ and a corresponding true difference image sparse coefficient $\alpha_{hl\_test}$, and verifying that the deep learning network obtained by training in e) is a mapping between the low-resolution image sparse coefficient and the difference image sparse coefficient when the error is less than a given threshold; and
   g) expressing the low-resolution image to be subjected to resolution increase as the matrix form $z_l$, expressing $z_l$ with the dictionary $D_l$, recording a corresponding sparse coefficient as $\beta_l$, inputting $\beta_l$ into the trained deep learning network to obtain a predicted difference image sparse coefficient $\beta_{hl}$, reconstructing a difference portion $\hat{z}_{hl}$ with the dictionary $D_{hl}$; and finally reducing $\hat{z}_h=\hat{z}_{hl}+z_l$ into an image form to reconstruct a corresponding high-resolution image $z_h$.

2. The method of claim 1, wherein in a), firstly, a high-resolution image in a training sample library is cut into N d×d image blocks; the resolution of each image block is reduced to obtain N corresponding low-resolution image blocks; then column vectors formed by stretching the high-resolution image blocks compose a matrix $y_h \in R^{d^2 \times N}$, and column vectors formed by stretching the low-resolution image blocks compose a matrix $y_l \in R^{d^2 \times N}$; and the difference portion $y_{hl}=y_h-y_l$ of two matrixes is obtained through computation.

3. The method of claim 1, wherein in b), dictionary training is respectively conducted on $y_l$ and $y_{hl}$ to obtain a corresponding low-resolution image dictionary $D_l$, a difference image dictionary $D_{hl}$ and corresponding sparse representation coefficients $\alpha_l$ and $\alpha_{hl}$, equivalent to solving optimization problems as follows:

$$\min_{D_l,\alpha_l} \|\alpha_l\|_0 \text{ subject to } \|y_l - D_l\alpha_l\|_F^2 \leq \varepsilon$$

$$\min_{D_{hl},\alpha_{hl}} \|\alpha_{hl}\|_0 \text{ subject to } \|y_{hl} - D_{hl}\alpha_{hl}\|_F^2 \leq \varepsilon$$

wherein $\varepsilon$ is a reconstruction error threshold.

4. The method of claim 1, wherein in d), the constructed deep learning network comprises L layers; the output of each layer is recorded as $x^l$, $l=0, 1, 2, \ldots, L$, wherein $x^0$ is a network input and then the output of an $l_{th}$ layer is:

$$x^l=f_l(W^l x^{l-1}+b^l), l=1,2,\ldots,L$$

wherein $W^l$ and $b^l$ respectively indicate the weight and the bias term of the $l_{th}$ layer, $f_l(\bullet)$ is an activation function of the $l_{th}$ layer, and the output of the $l_{th}$ layer is a network prediction.

5. The method of claim 1, wherein in e), an implicit relationship between the low-resolution image sparse coefficient $\alpha_{l\_train}$ and the difference image sparse coefficient $\alpha_{hl\_train}$ is trained by the deep learning network, and by using the low-resolution image sparse coefficient $\alpha_{l\_train}$ as the input of the deep learning network and using the difference image sparse coefficient $\alpha_{hl\_train}$ as a supervision, the network-predicted difference image sparse coefficient is recorded as $$\hat{\alpha}_{hl\_train}=f_L(\ldots f_l(W^l\alpha_{l\_train}+b^1)) \quad (4)$$

wherein $W^l$ and $b^l$ respectively indicate the weight and the bias term of the 1st layer, $f_l(\bullet)$ is an activation function of the 1st layer, and $f_L$ is an activation function of the Lth layer; and a root-mean-square error with a cost function of $\alpha_{hl\_train}-\hat{\alpha}_{hl\_train}$ is taken, $$MSRE = \frac{\|\alpha_{hl\_train} - \hat{\alpha}_{hl\_train}\|_F^2}{mn}$$

wherein m and n are respectively the number of dictionary elements and the number of training samples; and the network parameters are optimized iteratively so as to minimize a loss function MSRE, thereby completing network training.

* * * * *